US007295808B2

(12) United States Patent
Soliman

(10) Patent No.: US 7,295,808 B2
(45) Date of Patent: Nov. 13, 2007

(54) METHOD OF AND SYSTEM FOR CALIBRATING A REPEATER

(76) Inventor: Samir S. Soliman, 11412 Cypress Canyon Park Dr., San Diego, CA (US) 92131

( * ) Notice: Subject to any disclaimer, the term of this patent is extended or adjusted under 35 U.S.C. 154(b) by 381 days.

(21) Appl. No.: 10/366,960

(22) Filed: Feb. 14, 2003

(65) Prior Publication Data
US 2004/0048568 A1 Mar. 11, 2004

Related U.S. Application Data

(60) Provisional application No. 60/408,611, filed on Sep. 5, 2002.

(51) Int. Cl.
*H04B 3/36* (2006.01)
*H04B 1/60* (2006.01)
*H04B 7/185* (2006.01)
*H04Q 7/20* (2006.01)

(52) U.S. Cl. .............................. 455/13.1; 455/9; 455/7; 455/456.1; 455/456.2

(58) Field of Classification Search ............ 455/456.1, 455/456.2, 456.5, 456.6, 7, 9, 13.1
See application file for complete search history.

(56) References Cited

U.S. PATENT DOCUMENTS

| | | | | |
|---|---|---|---|---|
| 6,014,102 A | 1/2000 | Mitzlaff et al. | ............. | 342/457 |
| 6,252,543 B1 | 6/2001 | Camp | .................... | 342/357.06 |
| 6,445,927 B1* | 9/2002 | King et al. | ............... | 455/456.6 |
| 6,501,955 B1* | 12/2002 | Durrant et al. | .......... | 455/456.1 |
| 6,526,039 B1* | 2/2003 | Dahlman et al. | ........... | 370/350 |
| 6,700,537 B2* | 3/2004 | Dufour et al. | .............. | 342/418 |
| 6,782,265 B2* | 8/2004 | Perez-Breva et al. | .... | 455/456.1 |
| 2002/0065089 A1 | 5/2002 | Soliman | | |
| 2002/0086682 A1* | 7/2002 | Naghian | ..................... | 455/456 |

FOREIGN PATENT DOCUMENTS

| | | |
|---|---|---|
| WO | 0014906 | 3/2000 |
| WO | 0199444 | 12/2001 |
| WO | 0210987 | 2/2002 |
| WO | 0217669 | 2/2002 |
| WO | 0223215 | 3/2002 |
| WO | 02087275 | 10/2002 |

* cited by examiner

*Primary Examiner*—George Eng
*Assistant Examiner*—Un C. Cho
(74) *Attorney, Agent, or Firm*—Thomas Rouse; Bruce Greenhaus; Linda Gunderson

(57) ABSTRACT

A method of and system for calibrating a repeater in a wireless communications system are provided. The one or more calibration parameters for the repeater are derived from (a) time measurements derived from one or more signals relayed by the repeater and received at a plurality of different measurement positions, and (b) the positions of the measurement locations. In one application, the one or more parameters are used in determining the positions of subscriber stations in the wireless communications system.

2 Claims, 14 Drawing Sheets

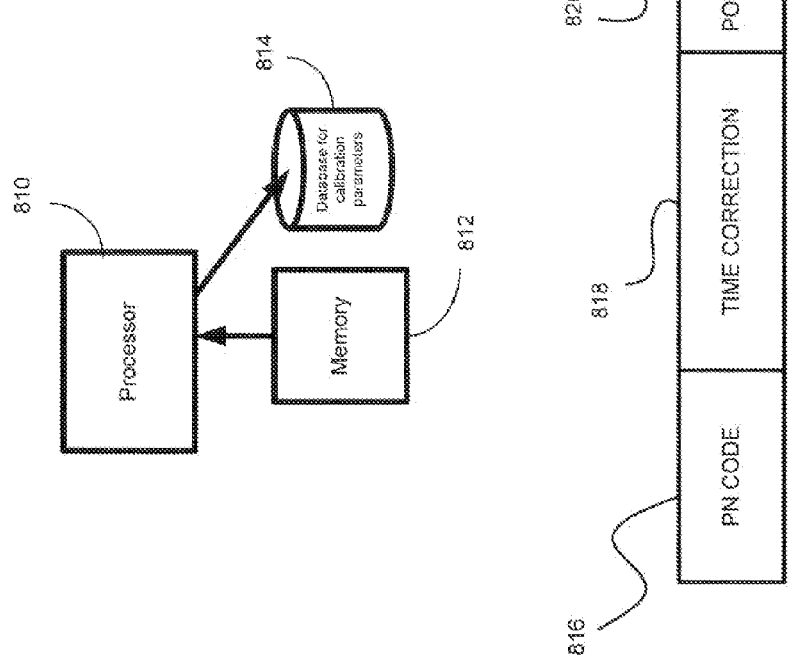

METHOD OF AND SYSTEM FOR CALIBRATING A REPEATER

RELATED APPLICATIONS

This application claims the benefit of provisional U.S. Application Ser. No. 60/408,611, entitled "Method of and System for Calibrating a Repeater," filed on Sep. 5, 2002, assigned to the assignee of the present application, and incorporated herein by reference in its entirety for all purposes.

FIELD OF THE INVENTION

The disclosed subject matter relates to the fields of position determination and wireless communications, and more specifically, to position determination in a wireless communications system that employs repeaters.

RELATED ART

Repeaters are a flexible and cost effective way to extend coverage or fill coverage gaps in wireless communications systems. They may also be used to render a particular pilot dominant within a coverage area of a CDMA system that is subject to many pilots. Examples of areas where repeaters typically prove useful for adding or extending coverage are terrain variations such as valleys, tunnels and buildings. For a small fraction of the cost of full base stations, repeaters are appropriate for use in new as well as well-established and mature networks.

There are several implementations of repeaters. In the most common implementation, the repeater acts as a bi-directional amplifier as shown in FIG. 1. On the forward (down) link, the repeater 104 receives a transmission from donor cell base station (BTS) 102, amplifies it and sends it to the subscriber station (SS) 106. The BTS 102 may be an omni station or a sector in a multi-sector cell. On the reverse link, the SS 106 sends a signal to the repeater 104. The repeater 104 amplifies the signal and sends it to the BTS 102. As can be seen, the repeater relays a reliable signal between the donor cell and the subscriber station in an area that may not otherwise have reliable coverage.

Pursuant to an FCC mandate, efforts are underway to equip subscriber stations with the capability of determining their locations from transmissions received from various reference sources, such as GPS satellites, base stations, or combinations of GPS satellites and base stations. The subscriber station receives transmissions from four or more references sources whose precise positions are known. These reference sources are synchronized to system time. The subscriber station then derives a time measurement from each of the transmissions. The time measurement represents the amount of time required for the signal to travel along a line-of-sight path between the reference source and the subscriber station. This time is commonly referred to as the "propagation time". The subscriber station then provides these time measurements to a position determination entity (PDE). In response, the PDE estimates the location of the subscriber station from (a) these time measurements, (b) the known speed of light, and (c) the known locations of the reference sources. Alternatively, the subscriber station uses this information to determine its own position.

The presence of repeaters in a wireless communications system can render the position determination process ambiguous. For example, due to the presence of repeaters, there is a danger that a subscriber station will erroneously assume a transmission originating from a base station but relayed by a repeater is a line-of-sight transmission from the base station. Since a time measurement derived from this transmission will overstate the propagation time between the base station and the subscriber station, an estimate of the location of the subscriber station based on this time measurement will be erroneous.

This problem may be further explained with reference to FIG. 2. As shown, subscriber station 212 receives transmissions from four reference sources, comprising GPS satellite 202, BTS 204, GPS satellite 206, and BTS 208. Each of the transmissions from sources 202, 204, and 206 is a line-of-sight transmission. However, there are two transmissions received from BTS 208. The first, identified with numeral 214, is received directly from BTS 208. The second, identified with numeral 216, is routed through repeater 210. Both transmissions from BTS 208 are modulated with the same PN code uniquely identifying BTS 208. The transmission 216 routed through the repeater 210 is stronger than transmission 214, and hence is chosen by the subscriber station 212 for use in the position determination process in lieu of the transmission 214.

The subscriber station 212, upon receiving the transmissions, erroneously identifies the transmission 216 relayed by repeater 210 as a line of sight transmission from BTS 208. Therefore, it also erroneously identifies the time measurement derived from this transmission as being representative of the propagation time between the BTS 208 and the subscriber station 212. However, this time measurement is not representative of this propagation time, but in fact overstates it. Consequently, a position estimate based on this time measurement will be erroneous.

SUMMARY

A method of calibrating a repeater in a wireless communications system is described. In one embodiment, the method begins by receiving a signal at each of several different measurement locations. Each signal originates from the same originating transmitter and is relayed by the repeater prior to being received at the measurement location. Time measurements are then derived from each of the signals. Each of the time measurements represents the time between transmission of the signal at the originating transmitter, and arrival of the signal at the measurement location. The positions of the measurement locations are either known or obtained. Calibration parameters for the repeater are then derived from (a) the time measurements, and (b) the positions of the measurement locations.

In one implementation, the calibration parameters for the repeater comprise (a) a time correction for the repeater, and (b) the position of the repeater. Both parameters are derived through application of an inverse triangulation procedure to time measurements derived from signals received at four different measurement locations. The signals all originate from the same donor base station and are each relayed by the repeater before being received at the measurement locations.

The time measurements derived at these four locations may be referred to as $m_i$, where $1 \leq i \leq 4$. Each time measurement $m_i$ can be expressed as:

$$m_i = \Delta + \tau_1 + \tau_R + \tau_{2i} \tag{1}$$

where:

$\tau_1$ = the forward link delay between the originating transmitter and the repeater $\tau_R$=the repeater self delay $\tau_{2i}$=the forward link delay between the repeater and the receiver at measurement location i $\Delta$=the offset between system time and time at the originating transmitter Assuming that the position of the repeater has the unknown coordinates ($x_R$, $y_R$, $z_R$), and the position of measurement location i has the known coordinates ($x_i$, $y_i$, $z_i$), the relationship between the time measurement $m_i$, the coordinates of the position of the repeater, and the coordinates of the position of measurement location i may be expressed as follows:

$$m_i = \Delta + \tau_1 + \tau_R + \frac{1}{c}\sqrt{(x_i - x_R)^2 + (y_i - y_R)^2 + (z_i - z_R)^2} \quad (2)$$

where c is the speed of light.

Note that (2) represents four separate equations, one for each of the measurement locations. These four equations can be solved for four unknowns. The first three unknowns are the coordinates of the position of the repeater ($x_R$, $y_R$, $z_R$). The fourth unknown is the time correction $\tau_T$ associated with the repeater, where $\tau_T = \Delta + \tau_1 + \tau_R$.

In one example, these four equations are differenced to form the following three equations:

$$c(m_2 - m_1) = \sqrt{(x_2 - x_R)^2 + (y_2 - y_R)^2 + (z_2 - z_R)^2} - \sqrt{(x_1 - x_R)^2 + (y_1 - y_R)^2 + (z_1 - z_R)^2} \quad (3)$$

$$c(m_3 - m_1) = \sqrt{(x_3 - x_R)^2 + (y_3 - y_R)^2 + (z_3 - z_R)^2} - \sqrt{(x_1 - x_R)^2 + (y_1 - y_R)^2 + (z_1 - z_R)^2} \quad (4)$$

$$c(m_4 - m_1) = \sqrt{(x_4 - x_R)^2 + (y_4 - y_R)^2 + (z_4 - z_R)^2} - \sqrt{(x_1 - x_R)^2 + (y_1 - y_R)^2 + (z_1 - z_R)^2} \quad (5)$$

Solving equations (3), (4) and (5) yields ($x_R$, $y_R$, $z_R$), the coordinates of the position of the repeater. Substituting these coordinates into any of the four equations represented by equation (2) yields the time correction $\tau_T$. The position of the repeater and the time correction for the repeater form the calibration parameters for the repeater.

In one application, these calibration parameters are stored for subsequent use in determining the positions of subscriber stations. In this application, the subscriber station receives a signal that is typically a composite of several component signals from reference sources visible to the subscriber station. The subscriber station derives a time measurement from one of the component signals. This time measurement represents the time between transmission of the component signal by the reference source and arrival of the signal at the subscriber station. The subscriber station also analyzes the signature of the composite signal to determine whether the component signal was relayed by a repeater.

If so, a PDE in communication with the subscriber station obtains the calibration parameters for the repeater from a database. In one embodiment, these calibration parameters consist of a time correction for, and position of, the repeater. The PDE corrects the time measurement using the time correction for the repeater. The corrected time measurement then represents the amount of time required for the signal to travel between the repeater and the subscriber station (commonly referred to as the "propagation time"). If $\tau_O$ refers to the original time measurement, $\tau_T$ refers to the time correction for the repeater, and $\tau_C$ refers to the corrected time measurement, then the PDE derives $\tau_C$ by subtracting $\tau_T$ from $\tau_O$. The relationship between these values can be expressed as:

$$\tau_C = \tau_O - \tau_T \quad (6)$$

The PDE then determines the position of the subscriber station from the corrected time measurement $\tau_C$ and the repeater position ($x_R$, $y_R$, $z_R$). It uses these values to determine the position of the subscriber station in lieu of the original time measurement $\tau_O$ and reference source position.

If the component signal was not relayed by a repeater, the PDE determines the location of the subscriber station from the uncorrected time measurement $\tau_O$ and reference source position.

Related systems are also described.

BRIEF DESCRIPTION OF THE DRAWINGS

The components in the figures are not necessarily to scale, emphasis instead being placed upon illustrating the principles of the disclosed subject matter. In the figures, like reference numerals designate corresponding parts throughout the different views.

FIG. 8A is a block diagram of an embodiment of a system for calibrating a repeater in a wireless communications system.

FIG. 8B is an example format of a database record which may be employed in the system of FIG. 8A for storing one or more calibration parameters for the repeater.

DETAILED DESCRIPTION

As used herein, the term "memory" refers to any processor-readable medium, including but not limited to RAM, ROM, EPROM, PROM, EEPROM, disk, floppy disk, hard disk, CD-ROM, DVD, or the like, on which may be stored a series of instructions executable by a processor.

The term "processor" refers to any device capable of executing a series of software instructions and includes, without limitation, a general- or special-purpose microprocessor, finite state machine, controller, computer, or digital signal processor.

Figure 1:
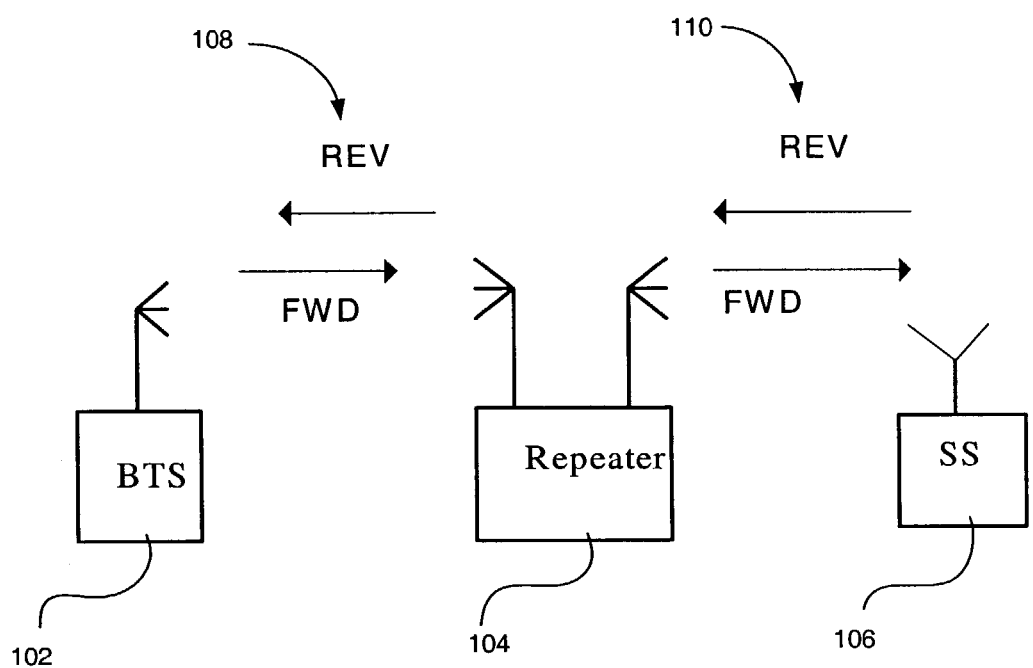
FIG. 1 is a block diagram of an embodiment of a repeater in a wireless communications system relaying signals between a base station and a subscriber station.
Figure 2:
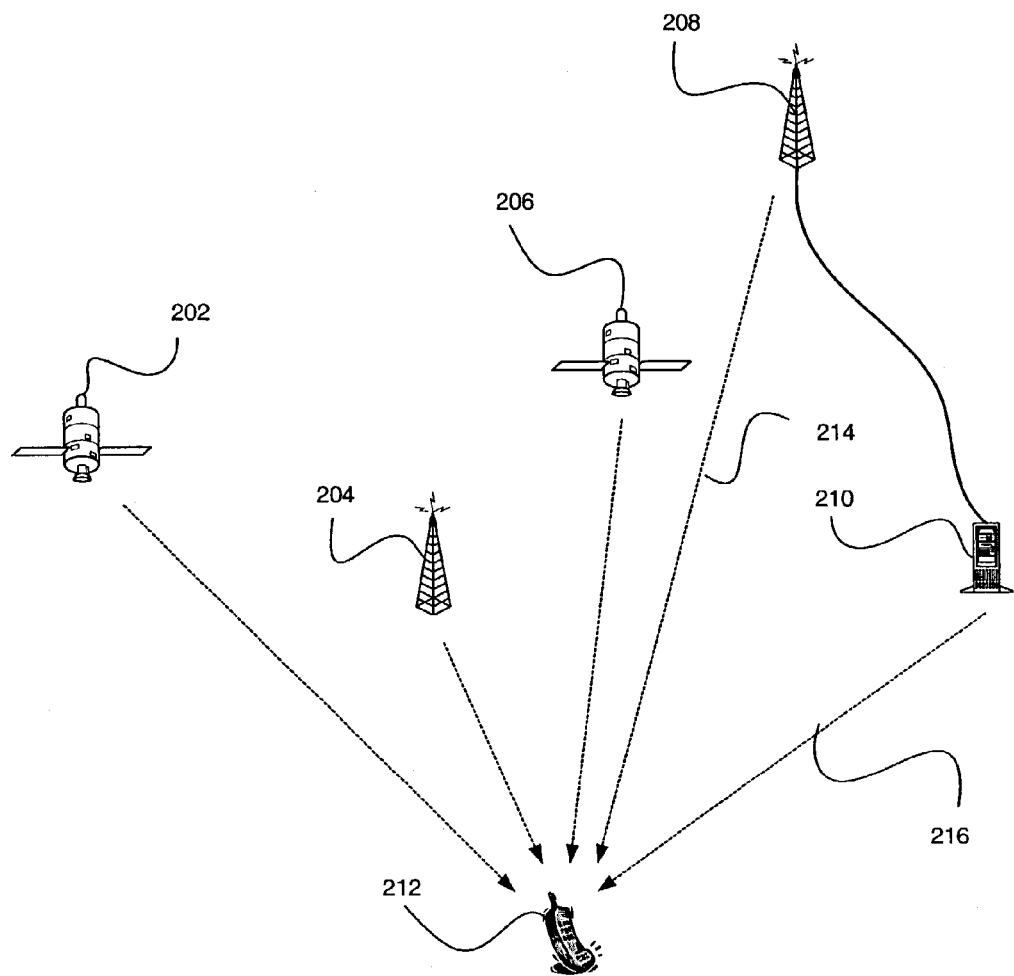
FIG. 2 is a block diagram illustrating the ambiguity that may be introduced by a repeater into the process of determining the position of a subscriber station.
Figure 3A:
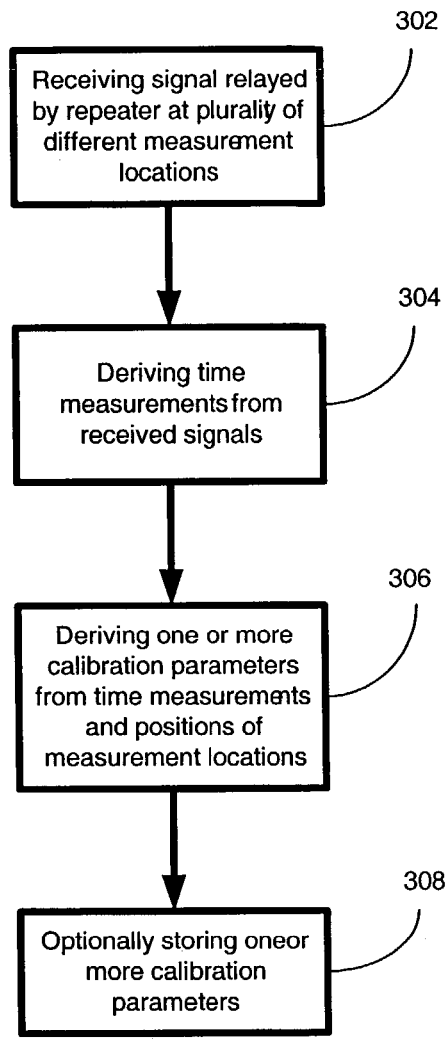
FIG. 3A is a flowchart of an embodiment of a method of calibrating a repeater.
Figure 3B:
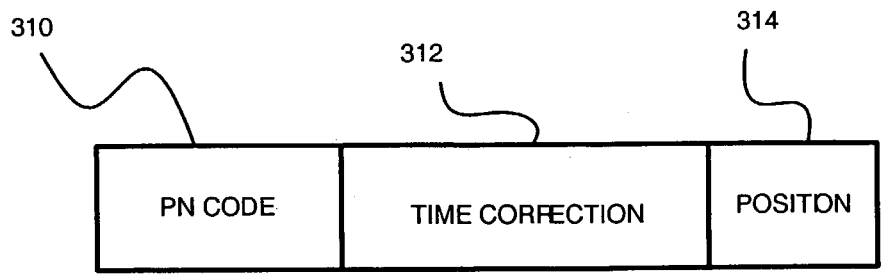
FIG. 3B illustrates an example of the format of a database record for storing the calibration parameters for a repeater.

FIG. 3A is a flowchart of an embodiment of a method of calibrating a repeater in a wireless communications system. In step 302, a signal relayed by a repeater is received at a plurality of different measurement locations. Step 304 follows step 302. In step 304, time measurements are derived from each of the measurement locations. Each time measurement represents the time between transmission of the signal by an originating transmitter and arrival of the signal at the measurement location (commonly referred to as the "propagation time").

From step 304, the method proceeds to step 306. In step 306, one or more calibration parameters for the repeater are derived from (a) the time measurements, and (b) the positions of the measurement locations.

This method may be further explained with reference to FIG. 4A, which illustrates an example of a wireless communications system in which a signal from base station 402 is transmitted over transmission medium 406 to repeater 404. Transmission medium 406 is any medium capable of transmitting the signal from transmitter 402, including by way of example and not limitation, an optical fiber, a conventional wireline link, or a wireless link.

Repeater 404 receives the signal, amplifies it and re-transmits it over a wireless communications link. The repeater 404 re-transmits the signal over a coverage area which includes measurement locations 408a, 408b, 408c, and 408d. A measuring device (not shown) at each of the measurement locations receives the signal as transmitted by base station 402 and relayed by repeater 404. The device then derives time measurements from the received signals. The time measurements are representative of the time elapsed between transmission of the signal by the base station 402 and arrival of the signal at the measurement location. These time measurements include the repeater self-delay and donor base station/repeater forward link delay.

Figure 4A:
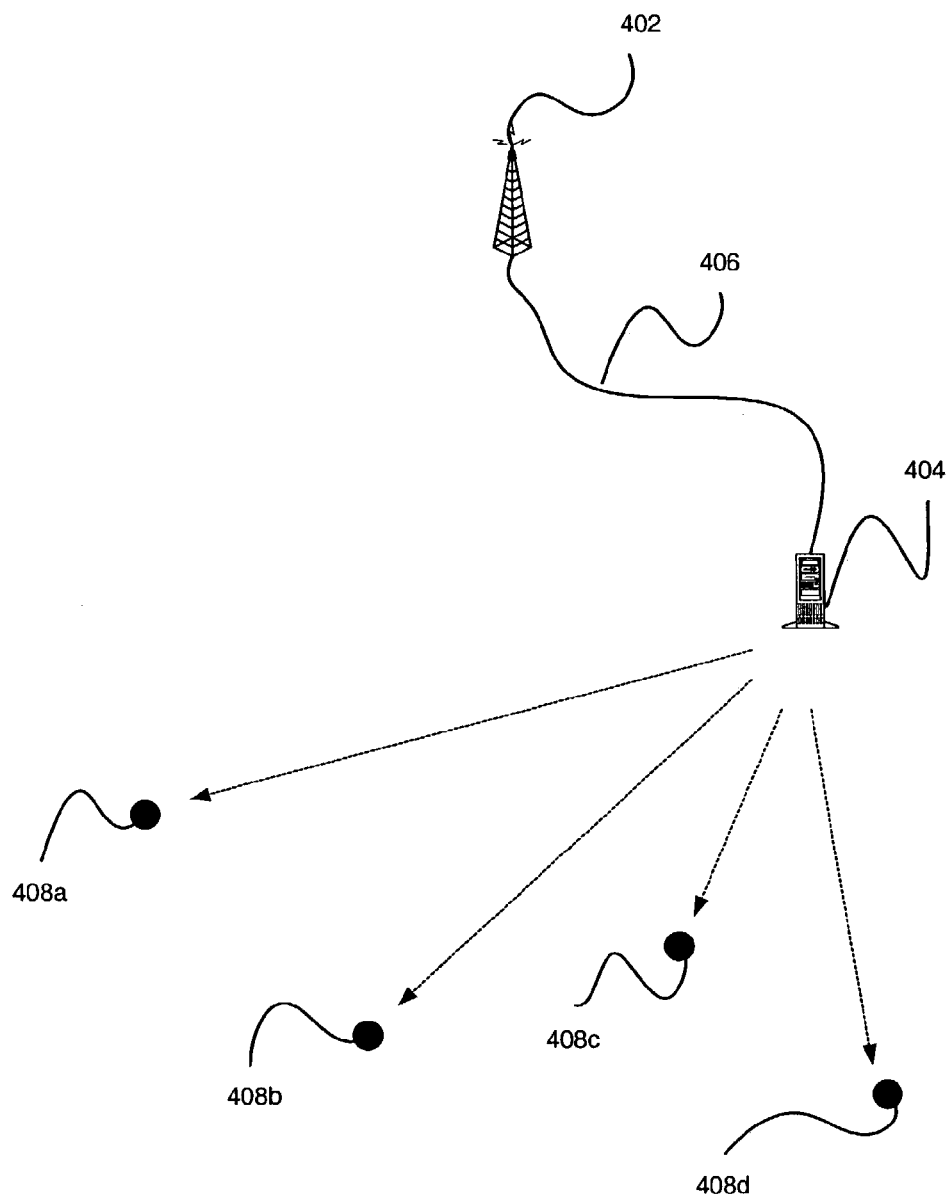
FIG. 4A illustrates an example of measurement locations which may be employed in the method of FIG. 3A.

Thus, in FIG. 4A, the time measurement derived at measurement location 408a is representative of the time between transmission of the signal by base station 402, and arrival of the signal at measurement location 408a. Similarly, the time measurement derived at measurement location 408b is representative of the time between transmission of the signal by base station 402, and arrival of the signal at measurement location 408b. The same applies to measurement locations 408c and 408d.

In one example, the signal relayed by a repeater is a pilot signal that originates from a base station in a CDMA wireless communications system. The pilot signal comprises a carrier signal modulated with a repeating PN code uniquely identifying the base station that originated the signal. A measuring device located at a measurement location first tunes to the pilot channel of the CDMA system, and then attempts to acquire the pilot signal being transmitted by the base station.

The measuring device attempts to acquire the signal by correlating the received signal with the PN code for the donor base station over a range of code phase shift hypotheses and over a range of Doppler frequency shift hypotheses. Each correlation is performed over an integration time I, that is the product of $N_C$ and M, where $N_C$ is the coherent integration time, and M is the number of coherent integrations that are non-coherently combined to form the correlation value.

The device then locates the peak in the correlation function that corresponds to a line of sight transmission by the repeater. In one implementation, the PN code of the donor base station is known, and the measurement locations are located far enough from the donor base station that a line of sight transmission from the donor base station cannot be detected at the measuring device. The earliest "non-sidelobe" peak in the correlation function thus represents the line of sight transmission from the repeater. It will be understood by those skilled in the art that a sidelobe is a relatively small peak occurs close to, and is related to, another relatively larger peak.

The device derives a time measurement from the location of the early non-sidelobe peak along the code phase dimension of the correlation function. A system time reference is obtained from a GPS receiver included in the device. The system time reference is used to adjust the time measurement so that the time measurement is in terms of system time.

The positions of the measurement locations are derived by the GPS receiver included with the device. The time measurements and positions of the measurement locations are then provided to a position determination entity (PDE). The PDE determines the calibration parameters for the repeater 404 responsive to this information. Alternatively, the subscriber station determines its own calibration parameters, or the collected data is stored for further processing at later time to determine the calibration parameters.

In one implementation, the calibration parameters for the repeater 404 include a time correction for the repeater and the position of the repeater. In this implementation, an inverse triangulation procedure is used to derive the time correction for and position of the repeater from time measurements taken at four different measurement locations. These four time measurements may be referred to as $m_i$, $1 \leq i \leq 4$. The positions of the corresponding measurement locations may be referred to as $(x_i, y_i, z_i)$, $1 \leq i \leq 4$.

Each of the time measurements represents the time between transmission of the signal by the originating transmitter and arrival of the signal at the measurement location. Included are the repeater self-delay and donor base station/repeater forward link delay. Thus, in FIG. 6, the time measurement $m_i$ is the time between time of transmission 602 and time of arrival 604, and can be expressed as:

$$m_i = \Delta + \tau_1 + \tau_R + \tau_{2i} \qquad (7)$$

where:

$\Delta$ = offset between system time and time at the originating (donor) transmitter $\tau_1$=the forward link delay between the originating transmitter and the repeater $\tau_R$=the repeater self delay $\tau_{2i}$=the forward link delay between the repeater and receiver at measurement location i Assuming that the position of the repeater has the unknown coordinates ($x_R$, $y_R$, $z_R$), the relationship between the time measurement $m_i$, the coordinates of the position of the repeater, and the coordinates of the position of the measurement location i may be expressed as follows:

$$m_i = \Delta + \tau_1 + \tau_R + \frac{1}{c}\sqrt{(x_i - x_R)^2 + (y_i - y_R)^2 + (z_i - z_R)^2} \quad (8)$$

where c is the speed of light.

Note that (8) represents four separate equations, one for each of the measurement locations. These four equations can be solved for four unknowns. These four unknowns consist of the coordinates of the position of the repeater ($x_R$, $y_R$, $z_R$), and the time correction $\tau_T$ associated with the repeater, where $\tau_T = \Delta + \tau_1 + \tau_R$.

In one implementation example, these four equations are differenced to form the following three equations:

$$c(m_2 - m_1) = \sqrt{(x_2 - x_R)^2 + (y_2 - y_R)^2 + (z_2 - z_R)^2} - \sqrt{(x_1 - x_R)^2 + (y_1 - y_R)^2 + (z_1 - z_R)^2} \quad (9)$$

$$c(m_3 - m_1) = \sqrt{(x_3 - x_R)^2 + (y_3 - y_R)^2 + (z_3 - z_R)^2} - \sqrt{(x_1 - x_R)^2 + (y_1 - y_R)^2 + (z_1 - z_R)^2} \quad (10)$$

$$c(m_4 - m_1) = \sqrt{(x_4 - x_R)^2 + (y_4 - y_R)^2 + (z_4 - z_R)^2} - \sqrt{(x_1 - x_R)^2 + (y_1 - y_R)^2 + (z_1 - z_R)^2} \quad (11)$$

Solving equations (9), (10) and (11) yields ($x_R$, $y_R$, $z_R$), the coordinates of the location of the repeater. Substituting these coordinates into any of the four equations represented by equation (8) yields the time correction $\tau_T$.

The time correction $\tau_T$ for the repeater cannot be decomposed through the foregoing method into its constituent pieces. However, from the standpoint of position location determination, this does not constitute a problem, because it is not necessary to decompose this parameter into its constituent pieces for accurate position determination.

A number of approaches are possible for collecting the time measurements $m_i$, $1 \leq i \leq 4$ and the positions ($x_i$, $y_i$, $z_i$), $1 \leq i \leq 4$ that form the inputs to the equations (8) above.

Figure 4B:
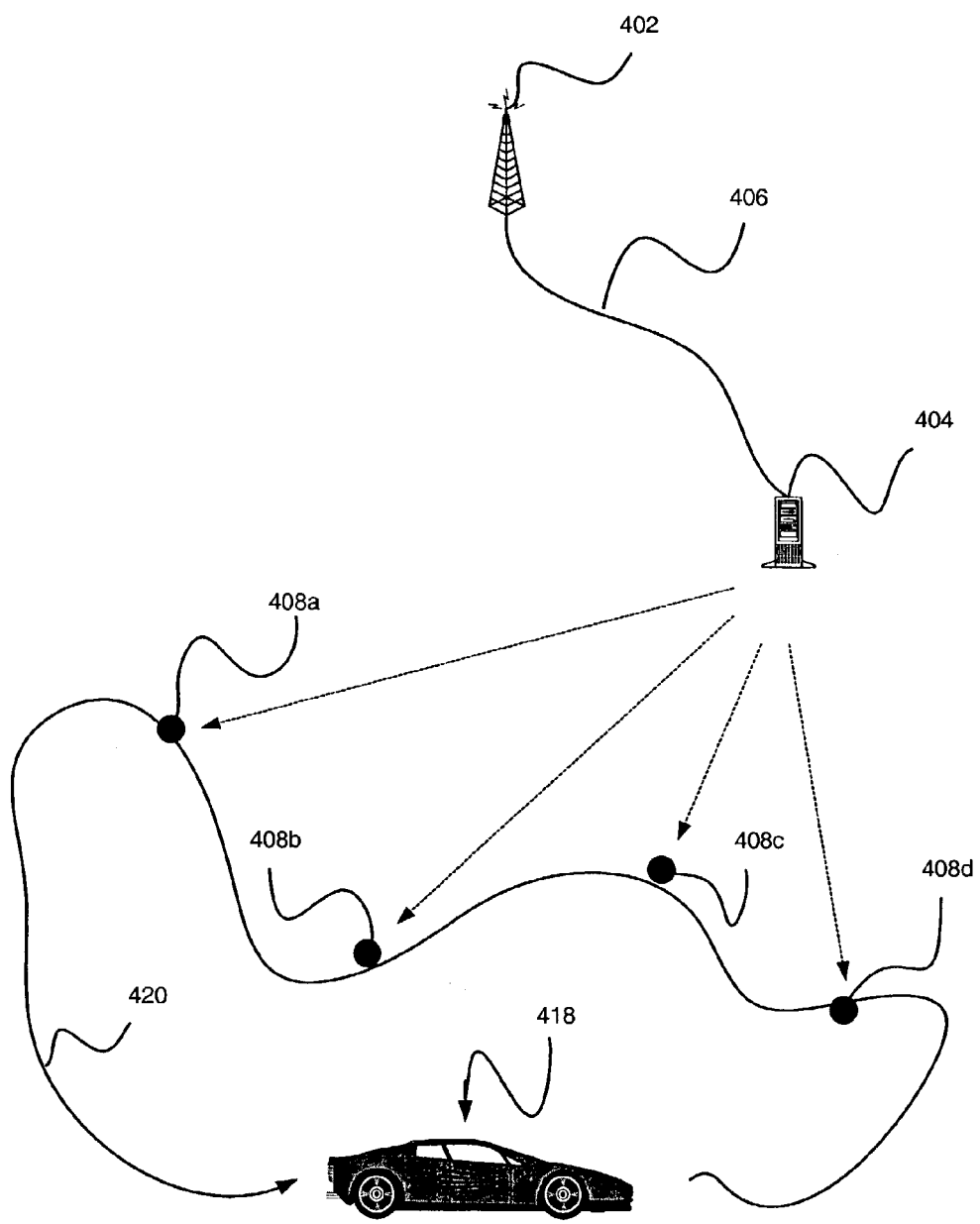
FIG. 4B illustrates an example where the measurement locations employed in the method of FIG. 3A are situated along a route driven by a vehicle.

In one embodiment, illustrated in FIG. 4B, a vehicle is driven along a path 420. The measurement locations 408a, 408b, 408c, and 408d are arbitrary locations situated along the path 420. The positions of these measurement locations are not known a priori.

A measuring device (not shown) accompanies the vehicle. The device includes a GPS receiver. As the vehicle is driven along the path 420, each of the measurement locations is successively encountered. A time measurement is derived by the measuring device at each such measurement location. In addition, a system time reference and position of each measurement location is obtained from the GPS receiver included in the device. The system time reference is used to adjust the time measurements so they are in terms of system time.

Figure 4C:
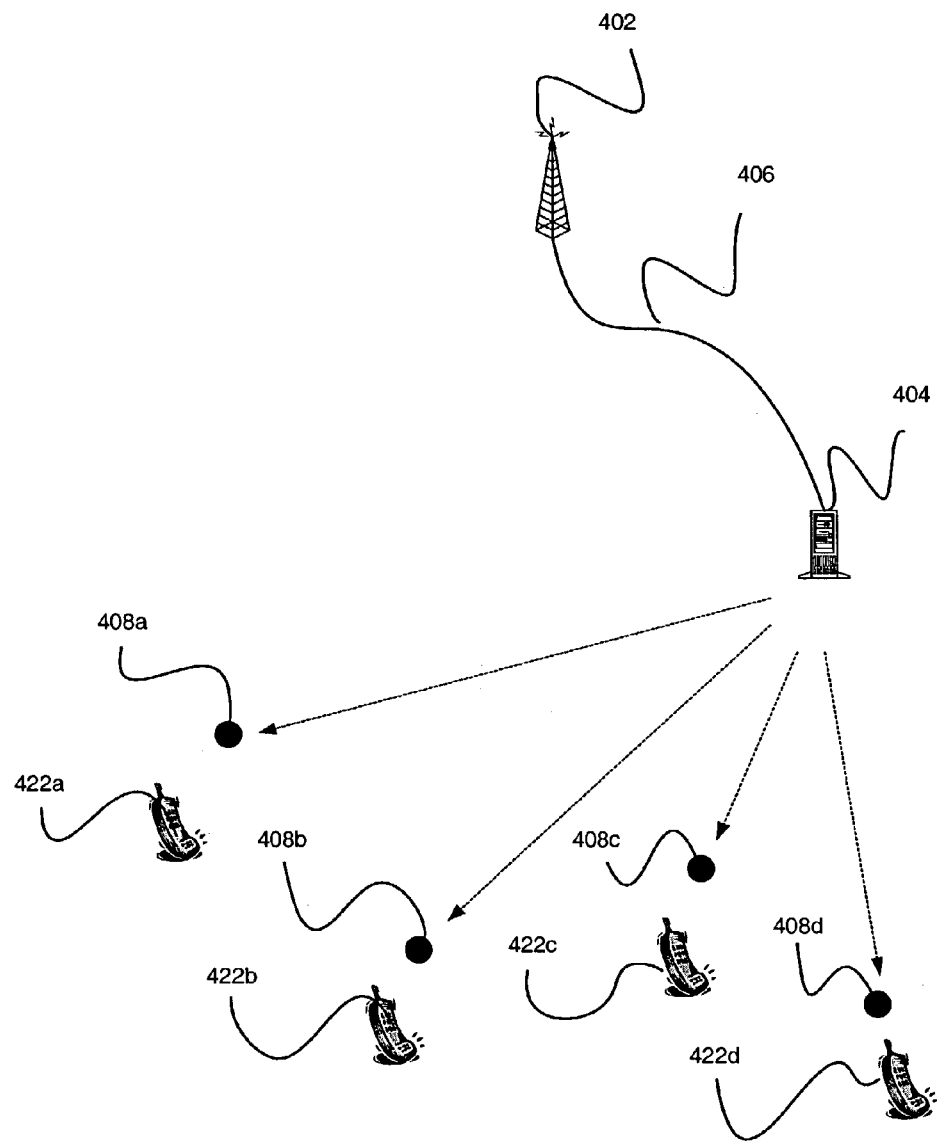
FIG. 4C illustrates an example where the time measurements employed in the method of FIG. 3A are concurrently derived from a plurality of dispersed measurement locations.

In a second embodiment, illustrated in FIG. 4C, a plurality of subscriber stations 422a, 422b, 422c and 422d are situated at dispersed measurement locations 408a, 408b, 408c, and 408d. A system time reference is derived from a GPS receiver located in the subscriber station. In addition, the position of the measurement location is obtained from the GPS receiver. A time measurement is derived by the subscriber station from a signal relayed by the repeater. The time measurement for the location is adjusted by the system time reference so it is in terms of system time.

In a third embodiment, the locations of the measurement locations are predetermined, and thus known beforehand. Fixed measuring devices are mounted at each of the measurement locations. Each device determines a time measurement from a signal relayed by the repeater. A system time reference is obtained and used to adjust the time measurements that are used in the calibration process.

Figure 5:
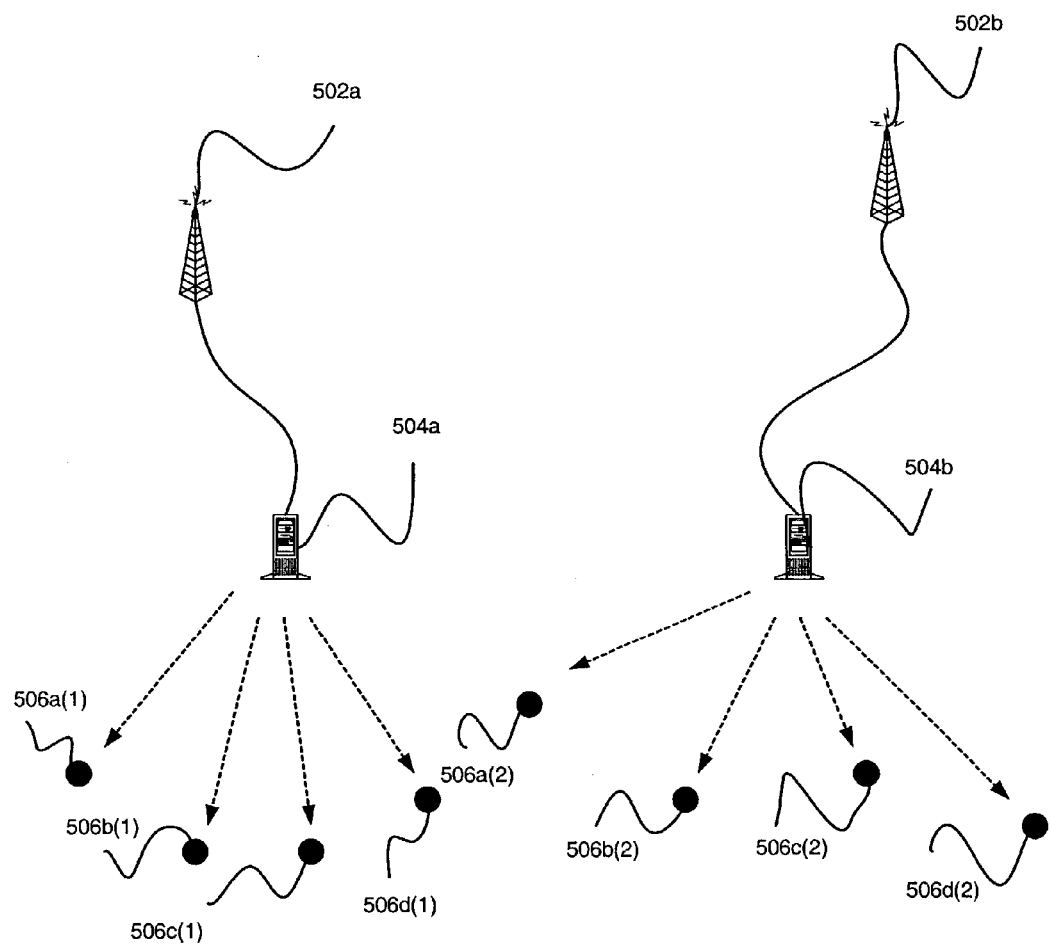
FIG. 5 illustrates an example in which time measurements taken from different sets of measurement locations are used to calibrate different repeaters in a wireless communication system.

The method of FIG. 3A may be applied to calibrate multiple repeaters in a wireless communications system. FIG. 5 illustrates an example of this process. Time measurements and positional information for each of the measurement locations 506a(1), 506b(1), 506c(1), and 506d(1) are used to calibrate repeater 504a. Similarly, time measurements and positional information for each of the measurement locations 506a(2), 506b(2), 506c(2), and 506d(2) are used to calibrate repeater 504b.

Note that, in the particular example illustrated in FIG. 5, there is no overlap between the measurement locations 506a(1), 506b(1), 506c(1), and 506d(1) used for calibrating repeater 504a and the measurement locations 506a(2), 506b(2), 506c(2), and 506d(2) used for calibrating repeater 504b. However, it should be appreciated that embodiments are possible where there is complete or partial overlap in these locations. Moreover, since the pilot signals originating from base stations 504a, 504b are modulated with different PN codes, a time measurement for both signals can be derived by the same measuring device located at a single measurement location.

Referring back to FIG. 3A, in optional step 308, the one or more calibration parameters are stored for subsequent use in determining the positions of subscriber stations. In one implementation, the one or more calibration parameters comprise a time correction for and position of the repeater. These two values are embodied as a database record that is indexed by the PN code of the donor base station. Similar records are present in the database for all repeaters in the network. Each of the records is indexed with the PN code for the corresponding donor base station. The result is an almanac for all repeaters in the network that is updated every time a calibration procedure is performed. To ensure that the almanac is up to date, the calibration procedure is preferably performed periodically or at least every time a change is made to the network, such as the addition of a repeater. In one embodiment, the database is accessible to a PDE that determines the positions of subscriber stations. In an alternative embodiment, the database is accessible to subscriber stations that determine their own positions.

Figure 7A:
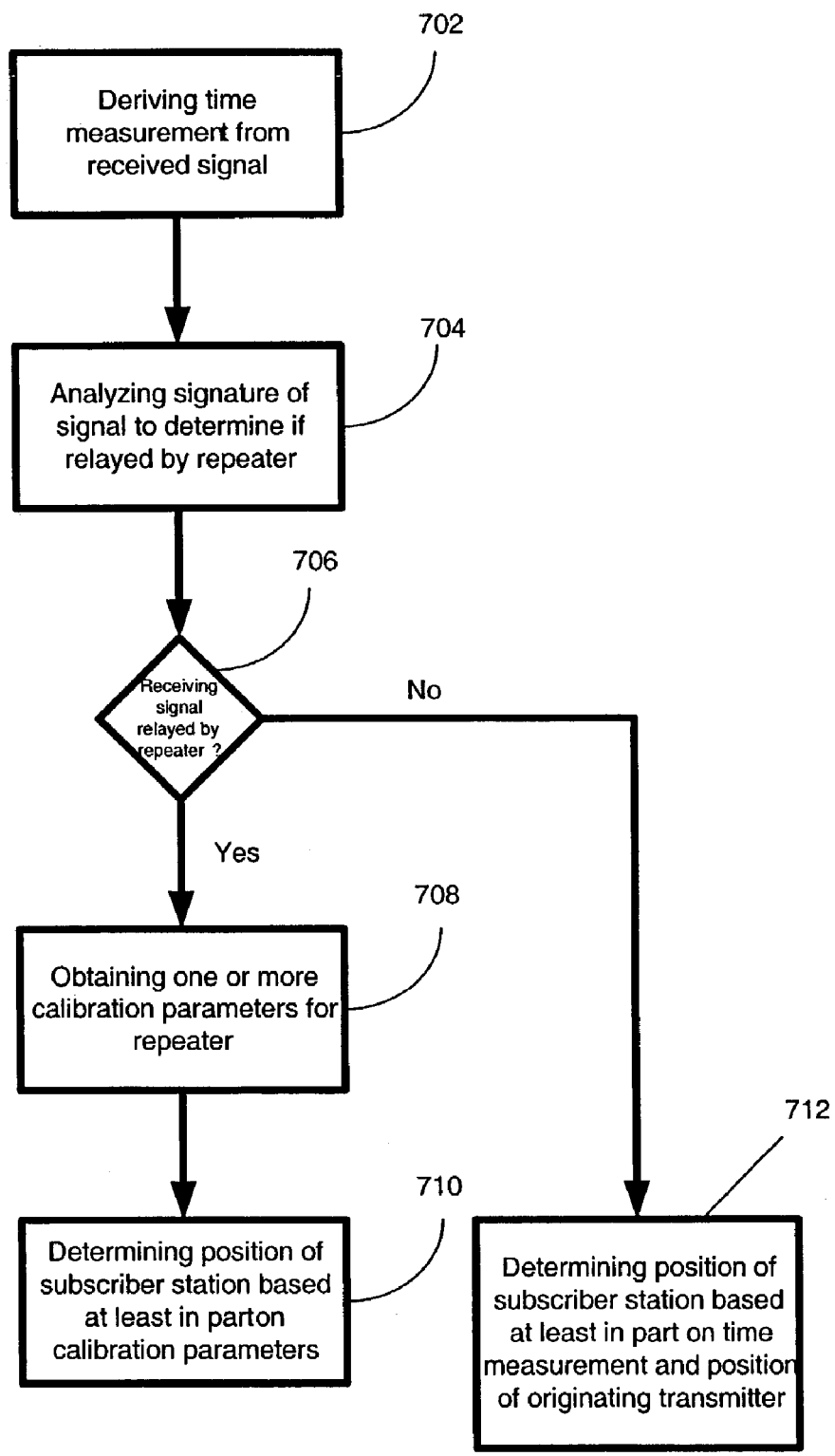
FIG. 7A is a flowchart of an embodiment of a method of determining the position of a subscriber station in a wireless communications system employing repeaters.

FIG. 7A illustrates an embodiment of a method for determining the location of a subscriber station in a wireless communications system employing repeaters.

The method begins with step 702. Step 702 comprises deriving a time measurement from a received signal. The received signal is generally a composite of several component signals transmitted by reference sources visible to the receiver, but can comprise only a single component. The time measurement is representative of the time between transmission of one of the component signals by the corresponding reference source, and arrival of the signal at the receiver.

From step 702, the method proceeds to step 704. In step 704, the method analyzes the "signature" of the composite signal to determine whether or not the component signal was relayed by a repeater.

In general, the "signature" of the composite signal comprises (a) the number of component signals visible to the receiver; (b) characteristics of each component, (c) the relative strength of these signals, and (d) the relative delay of these signals. The "signature" of the composite signal preferably conveys information sufficient to determine whether a repeater relayed the component signal.

In one implementation, the component signals are pilot signals, and the "signature" of the composite signal includes: (1) the total number of pilot signals visible to the receiver, (2) characteristics of each pilot signal, (3) their relative signal strength, and (4) their relative times of arrival at the receiver. The detection of other pilots at the receiver generally identifies the donor cell as the immediate source of the received signal. On the other hand, the lack of any other pilots at the receiver generally identifies the repeater as the immediate source of the component signal. A certain pattern of pilots from other cells, their relative signal strength and time of arrivals can be used to rule out or identify specific repeaters.

For example, if there is an overlap in coverage area between the donor cell and the repeater, and the receiver is present in this area of overlap, the line of sight (LOS) signal received directly from the donor cell and that relayed by the repeater are marked with the same PN code. Consequently, both signals will give rise to peaks in the correlation function. If neither signal is subject to multi-path, the peak in the correlation function due to the repeater will be delayed relative to that due to the LOS signal. The peak resulting from the repeater can thus be identified on the basis of this relative delay.

As a second example, if the LOS signal from the donor cell is subject to multi-path, it may be difficult to distinguish the peaks due to multi-path from the peak due to the repeater. However, this ambiguity can be resolved during the design and deployment phase by ensuring that the delay due to transmission through the repeater exceeds that associated with any multi-path produced by the RF environment. In this case, the repeater will leave a signature footprint in the correlation function in the form of a peak that is delayed beyond that due to multi-path.

As a third example, if there is only a single peak in the correlation function for the PN code in question, and no other pilots are visible to the receiver, it can be assumed that the receiver is in an area that is only accessible to signals relayed by the repeater. The single peak at the PN code in question can therefore be assumed to be due to a repeater.

As a fourth example, the calibration parameters for a particular PN code can be used to determine whether a repeater relayed a particular component signal. More specifically, if the time correction $\tau_T$ for the PN code greatly exceeds the corrected time measurement derived using this time correction, it can be assumed that a repeater relayed the component signal.

Returning to FIG. 7A, from step 704, the method proceeds to step 706. In step 706, the method queries whether a repeater relayed the component signal. If so, step 708 is performed. In step 708, the method comprises obtaining one or more calibration parameters for the repeater. In one implementation, this step comprises retrieving pre-determined calibration parameters from a database. In one example, these values are obtained by retrieving these parameters from a database record using the PN code of the donor cell as an index to the database. In a second implementation, this step comprises determining these parameters "on the fly."

From step 708, the method proceeds to step 710. Step 710 comprises determining the position of the subscriber station from the one or more calibration parameters obtained in step 708.

In step 706, if the received signal was not relayed by a repeater, step 712 is performed. In step 712, the position of the subscriber station is determined from the time measurement derived in step 702, and the position of the originating transmitter.

Figure 7B:
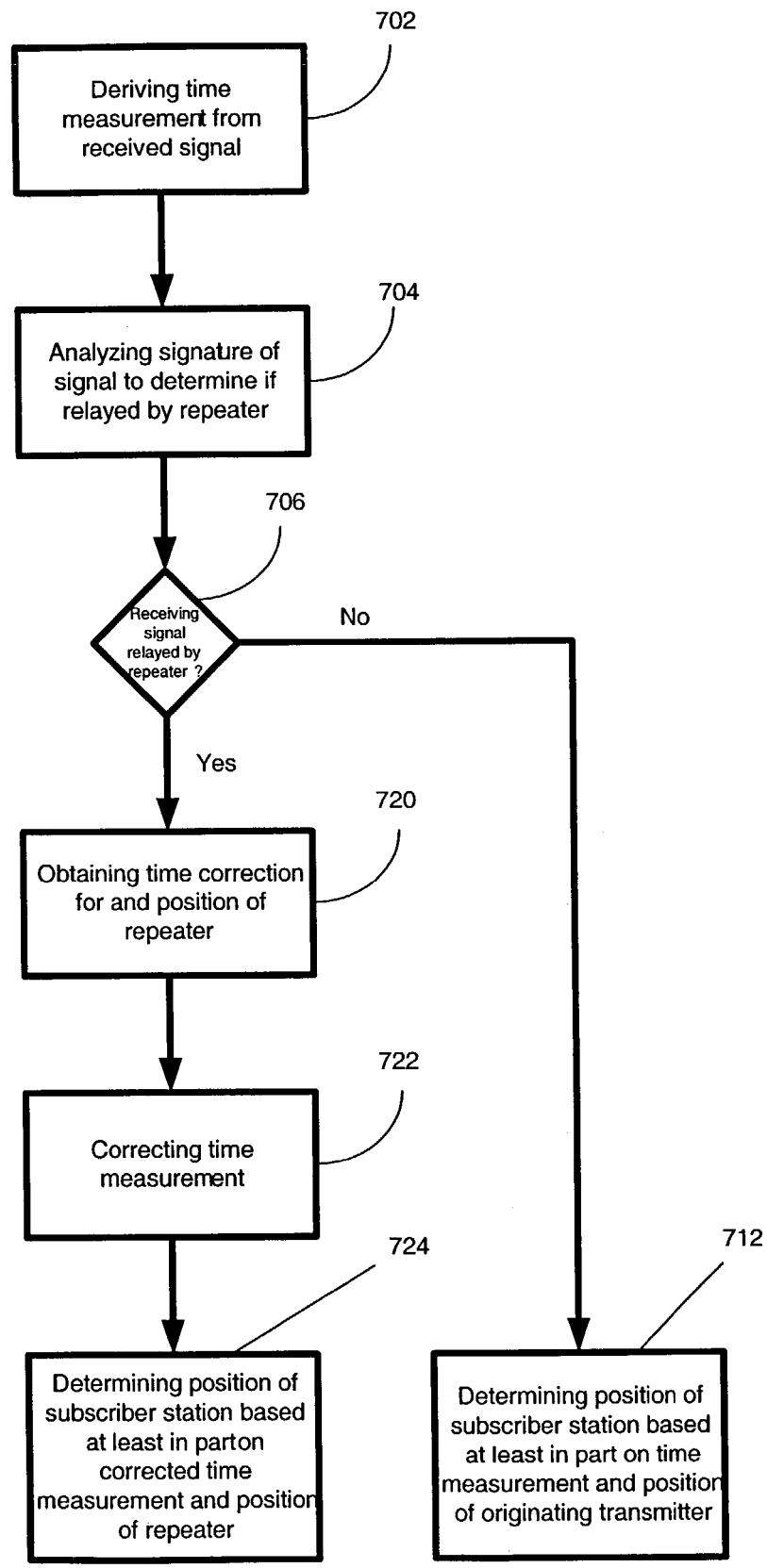
FIG. 7B is a flowchart of an implementation of the method of FIG. 7A.

FIG. 7B illustrates an implementation of the method of FIG. 7B. Steps 702, 704, 706, and 712 were already explained in the context of FIG. 7A. Only steps 720-724 are explained here.

In step 720, a time correction for and the position of the repeater are obtained. In one implementation, these parameters are retrieved from a database using the PN code of the donor cell as an index.

From step 720, the method proceeds to step 722. Step 722 comprises correcting the time measurement derived in step 702 using the time correction for the repeater obtained in step 720. In one implementation, this step comprises subtracting the time correction $\tau_T$ from the time measurement $\tau_O$ to form a corrected time measurement $\tau_C$, where $\tau_C = \tau_O - \tau_T$.

From step 722, the method proceeds to step 724. There, the position of the subscriber station is determined from the corrected time measurement $\tau_C$ and the position of the repeater.

FIG. 8A illustrates an embodiment of a system for calibrating one or more parameters for a repeater in a wireless communications system. The system comprises a processor 810 that is configured to determine the one or more calibration parameters for the repeater from time measurements and measurement location positions obtained through any of the previously discussed methods.

In one implementation, the processor is located within a PDE, and is configured to determine a time correction and position of the repeater by solving the four equations represented by (8) above. In this implementation, the processor 810 is configured to derive the parameters by executing software in the form of a series of instructions stored in memory 812.

In one implementation, once these parameters have been determined, the processor 810 is configured to store them as a record in database 814, indexed using the PN code of the donor cell.

The record has the format shown in FIG. 8B. Field 816 is the PN code of the donor cell. Field 818 is the time correction for the repeater. Field 820 is the position of the repeater.

Figure 9:
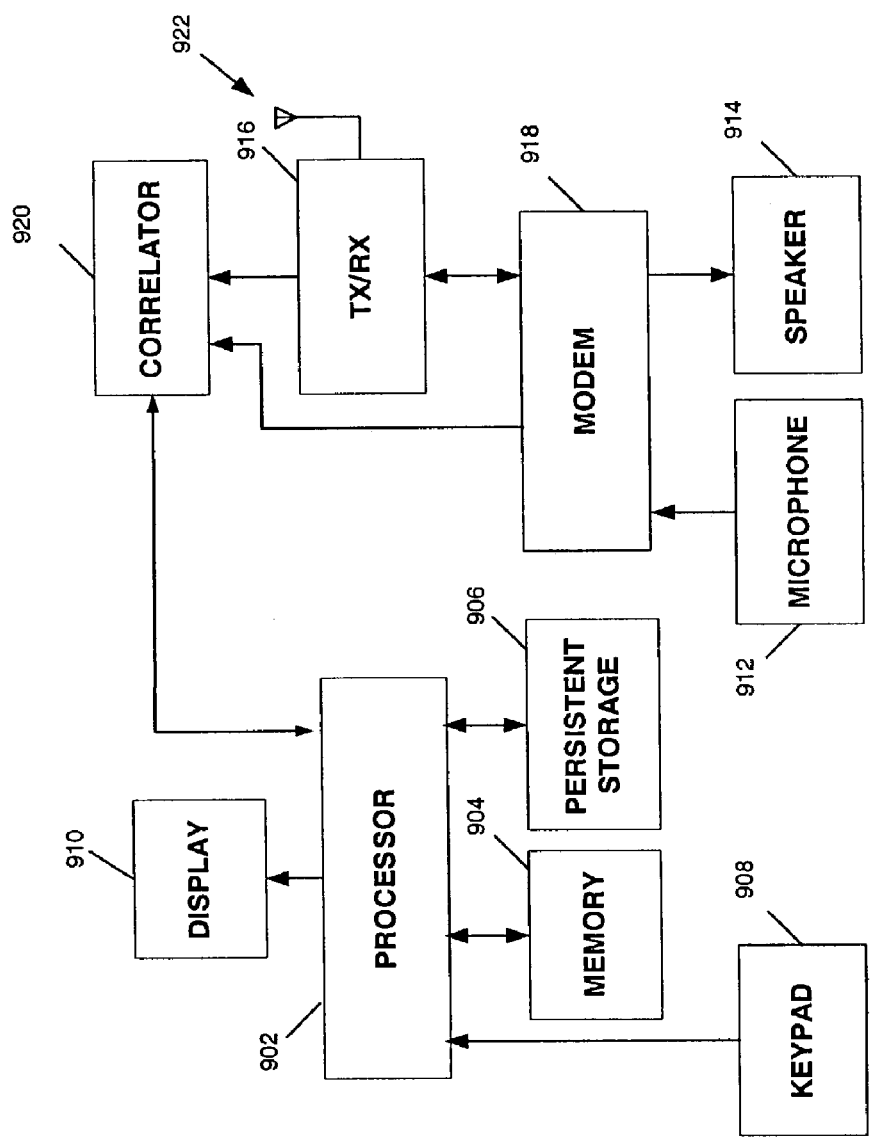
FIG. 9 is a block diagram of an implementation of a subscriber station particularly suited for use in a wireless communications system employing repeaters.

FIG. 9 is a block diagram of a subscriber station that is particularly suited for use in a wireless communications system employing repeaters.

Processor 902 is configured to execute software instructions, and memory 904 is configured to hold the software instructions and data that are accessible by the processor 902.

Persistent storage 906 is configured to hold provisioning information useful for acquiring wireless communications services, and can be implemented as a combination of devices such as a non-volatile EEPROM combined with a SIM card.

Keypad 908 and display 910 are both typically provided as part of a user interface. Similarly, microphone 912 and speaker 914 are both typically provided to support use of the device for receiving and transmitting voice.

Radio transceiver (Tx/Rx) 916 is provided for receiving and transmitting information over a wireless communications link. Modem 918 is provided for modulating baseband information, such as voice or data, onto an RF carrier, and demodulating a modulated RF carrier to obtain baseband information. Antenna 922 is provided for transmitting a modulated RF carrier over a wireless communications link and receiving a modulated RF carrier over a wireless communications link.

Correlator 920 is provided for deriving correlation functions from a received signal comprising a composite of pilot signals transmitted by various reference sources visible to the subscriber station. For a given PN code, the correlator 920 derives a correlation function by correlating the received signal with the PN code over a range of code phase shift hypotheses and a range of Doppler frequency shift hypotheses. It then locates a predetermined number of the peaks of the correlation function.

Processor 902 is configured to analyze this information to determine the earliest non-sidelobe peak of the correlation function. If such a peak is detected, the processor 902 is also configured to derive a time measurement from the location of this peak in the code phase dimension. If a system time reference is available, the processor 902 adjusts the time reference using the system time reference so that the time measurement is in terms of system time.

Processor 902 is also configured to analyze the signature of the received signal to determine if the peak relates to a pilot signal received directly from the reference source or if it relates to a signal that was relayed by a repeater. This process was previously described in relation to FIG. 7A.

Figure 10:
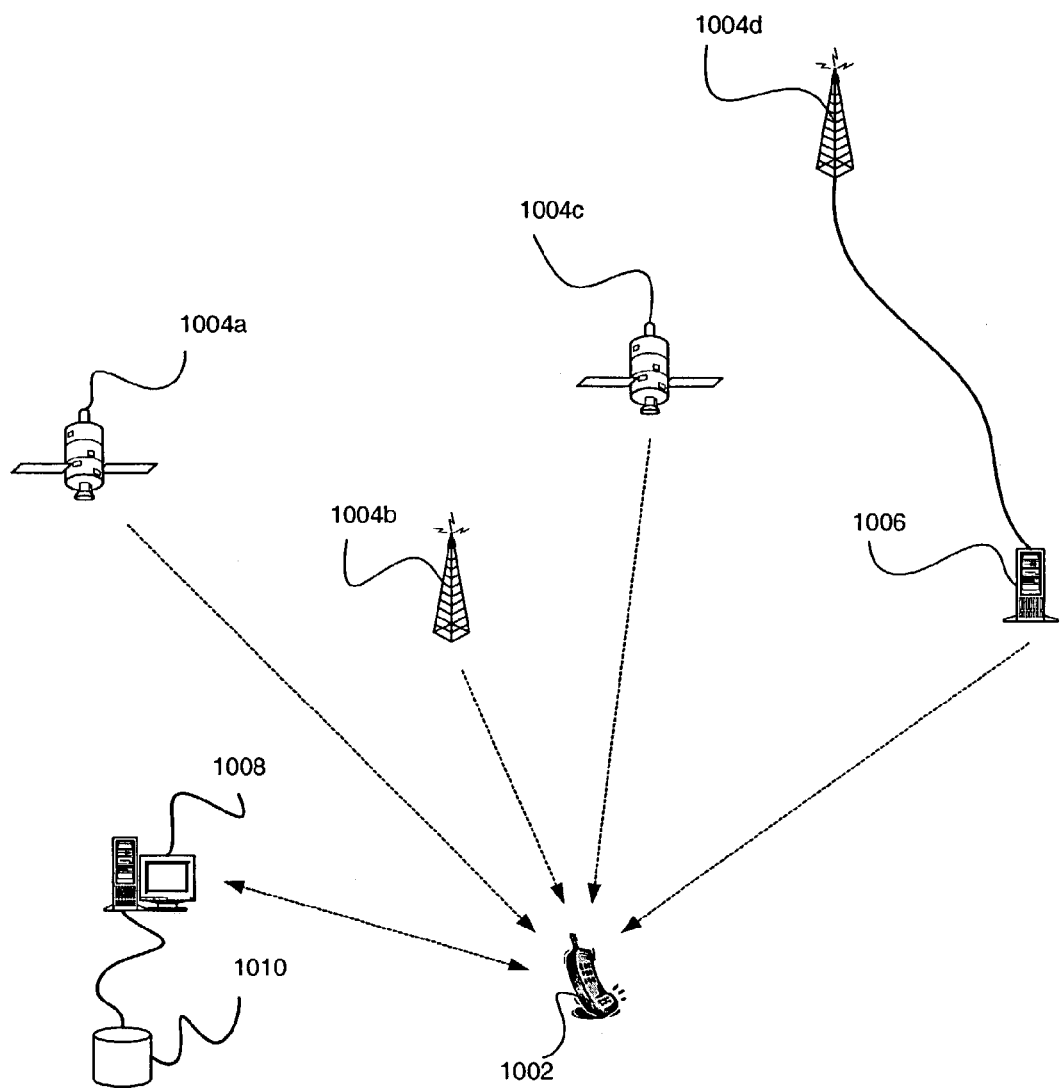
FIG. 10 is a diagram of an example of a position determination system in which one or more calibration parameter for a repeater are stored in a database, and subsequently used for determining the positions of subscriber stations.

FIG. 10 illustrates an example of a system for determining the position of a subscriber station in a wireless communication system employing repeaters. Subscriber station 1002 receives signals transmitted by a plurality of reference sources 1004a, 1004b, 1004c, and 1004d, visible to the receiver in the subscriber station. As illustrated, the reference sources may be BTSs, GPS satellites, or combinations of BTSs and GPS satellites.

Each of the reference sources transmits a signal that is modulated with an identification code that uniquely identifies the reference source. In one implementation, the identification codes are PN codes that may differ in length or periodicity according to the reference source involved. For IS-95 compliant CDMA systems, the PN code is a sequence of 32,768 chips that is repeated every 26.67 msec. In current GPS systems, the PN code is a sequence of 1,023 chips. The sequence is repeated every one millisecond.

The signals transmitted by reference sources 1004a, 1004b, and 1004c, are all received directly by the subscriber station 1002. Thus, all are line of sight signals. However, the signal transmitted by base station 1004d is relayed by repeater 1006, and this is not a line of sight signal from the standpoint of the donor cell 1004d.

A database 1010 is accessible to position determination entity (PDE) 1008. The database 1010 contains entries for each of the repeaters that are present in the wireless communications system. Each of the entries comprises a record that contains the position of and time correction for the corresponding repeater. This information is derived using any of the methods for calibrating a repeater that have been previously discussed. Each entry is indexed using the PN code of the donor cell.

The subscriber station 1002 is equipped with a correlator that, in conjunction with related software executable by a processor within the subscriber station, is configured to derive a time measurement for each of the pilot signals. If a system time reference is available, the subscriber station 1002 uses this information to adjust the time measurements so they are in terms of system time. Alternatively, this task is performed by the PDE 1008.

The subscriber station 1002 then communicates the time measurements to PDE 1008. Upon receipt of this information, PDE 1008 checks the signature of the composite signal to determine if any of the pilot signals were relayed by a repeater. The process of analyzing the signature of a composite signal to determine the immediate origin of a composite signal was previously discussed in relation to the method of FIG. 7A.

If a time measurement derived from a signal relayed by a repeater is present, then the PDE 1008 uses the PN code for the donor cell to retrieve the calibration parameters for the repeater from the database 1010. In particular, the PDE 1010 retrieves a record containing the time correction for, and position of, the repeater. It then uses the time correction for the repeater to correct the time measurement. It also substitutes the position of the repeater for that of the donor cell. It performs these adjustments for each of the time measurements determined to involve signals relayed by a repeater.

It then determines the position of the subscriber station 1002 using the corrected time measurements and updated positions. Again, in one implementation, known triangulation procedures are used to derive the position of subscriber station 1002. Once determined, the position of the subscriber station 1002 may be communicated by the PDE 1008 to the subscriber station 1002 or some other network entity.

Alternatively, the subscriber station 1002 determines its own position using the database of calibration parameters that is accessible by the subscriber station 1002.

While various embodiments of the disclosed subject matter have been described, it will be apparent to those of ordinary skill in the art that many more embodiments and implementations are possible.

Figure 6:
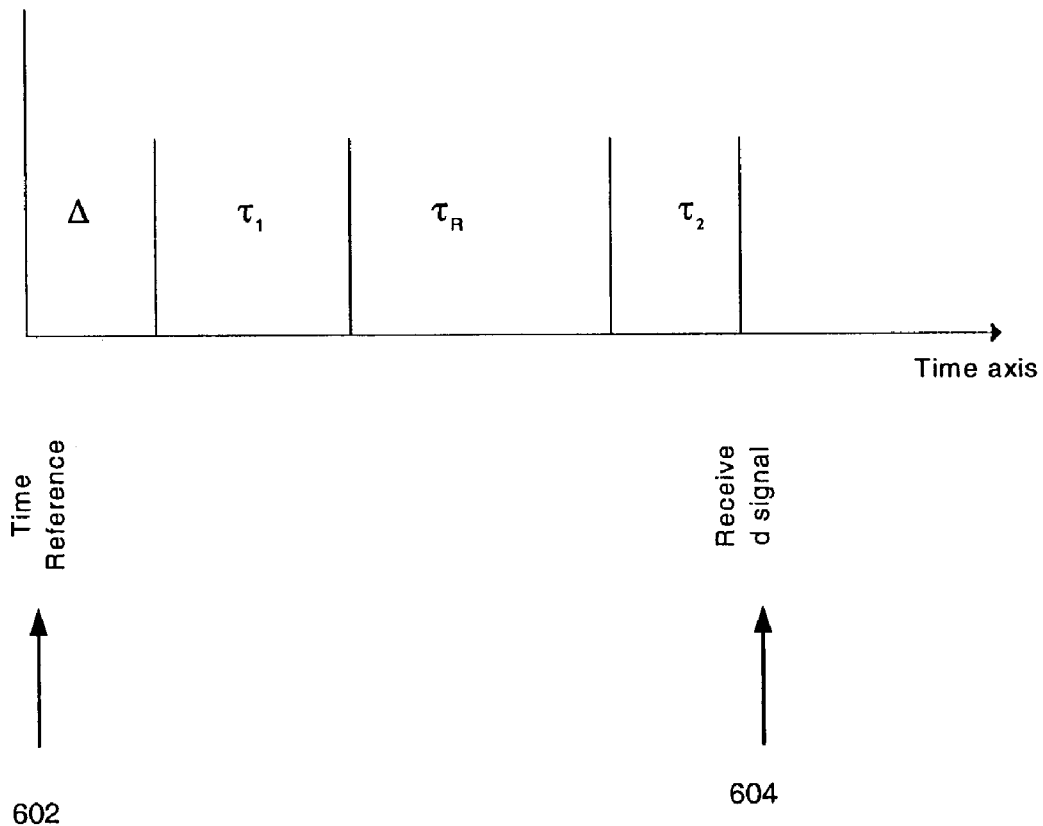
FIG. 6 is a timing diagram illustrating the various components of a propagation time measurement for a signal relayed by a repeater.
Figure 11:
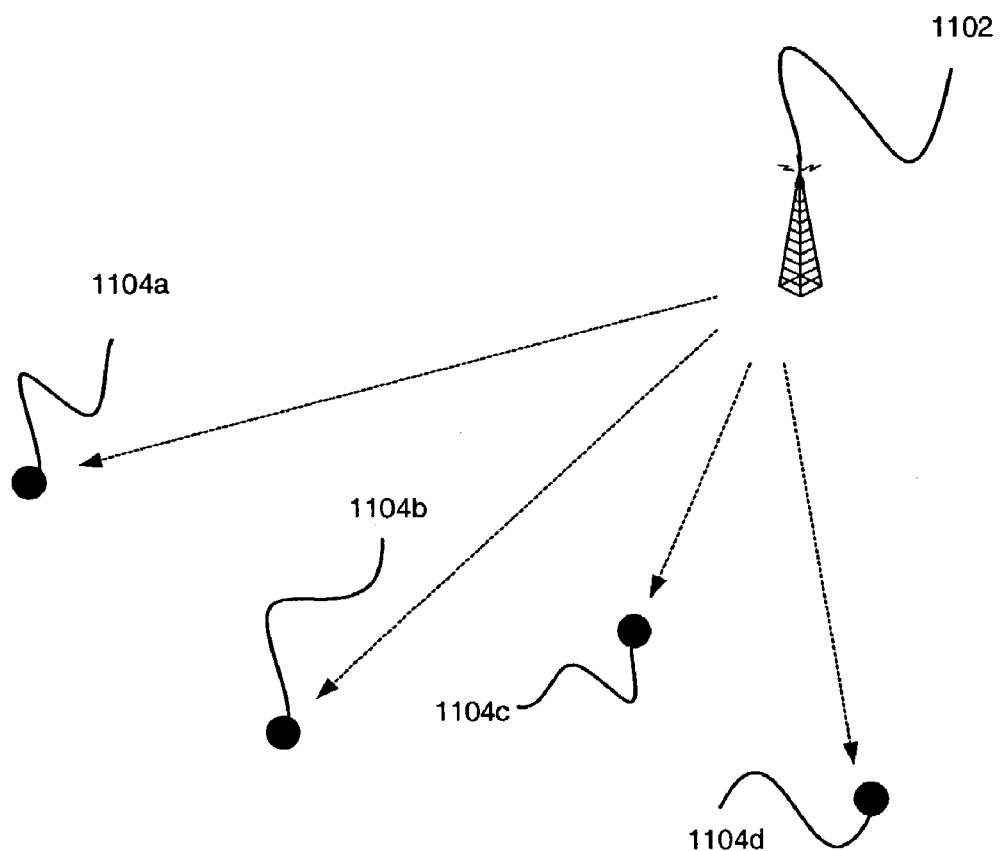
FIG. 11 is a diagram illustrating calibration of a base station according to an embodiment of the disclosed subject matter.

In particular, embodiments are possible in which network entities other than repeaters may be calibrated through application of the methods described. For example, FIG. 11 illustrates the method of FIG. 3A applied to the process of calibrating a base station. Referring to FIG. 6, the time correction for a base station will comprise the component referred to as $\Delta$, the offset between system time and time as maintained at the base station, but does not include the components referred to as $\tau_1$ or $\tau_R$. Other than this difference, the approach for calibrating the base station is identical to that described previously in relation to a repeater.

One or more signals are transmitted from BTS 1102 over a wireless communications link. The transmission occurs over a coverage area that includes measurement locations 1104a, 1104b, 1104c, and 1104d. A receiver (not shown) at each of the measurement locations receives a signal as transmitted by BTS 1102.

A time measurement is derived from the signal received at each of the measurement locations. In one implementation, the time measurement is representative of the travel time between BTS 1102 and the receiver (commonly referred to as the "propagation time"). Thus, in the example illustrated in FIG. 11, the time measurement derived at measurement location 1104a is representative of the propagation time from BTS 1102 to measurement location 1104a. Similarly, the time measurement derived at measurement location 1104b is representative of the propagation time from BTS 1102 to measurement location 1104b. The same applies to measurement locations 1104c and 1104d.

One or more calibration parameters for BTS 1102 are then determined responsive to the time measurements and the locations of the measurement locations. In one implementation, the calibration parameters for BTS 1102 comprise a time correction for and position of BTS 1102. These parameters are determined from the time measurements and positions of the measurement locations using the equations (8) referred to previously.

Embodiments are also possible in which the calibration parameters are used for determining the positions of subscriber stations in any position determination system, including without limitation terrestrial systems, network-based or subscriber station based terrestrial systems, GPS satellite systems, or hybrids thereof. Moreover, any method of position determination may be employed, including without limitation AOA, TOA, cell ID, with or without TA or RTD enhancements, E-OTD, OTDOA, or A-GPS, with or without IPDL, TA-IPDL, or OTDOA-PE modifications.

Accordingly, the invention is not to be restricted except by the appended claims.

What is claimed is:

1. A method of calibrating a repeater in a wireless communications system comprising:
   receiving a signal, transmitted by an originating transmitter and relayed by a repeater, at a plurality of different measurement locations;
   deriving time measurements from each of the received signals, each time measurement representative of the time between transmission of the signal by the originating transmitter and arrival of the signal at the measurement location, wherein the time measurements are obtained at four different measurement locations and may be referred to as $m_i$, $1 \leq m \leq 4$, each of the measurement locations has a position with coordinates $(x_i, y_i, z_i)$, and the time correction $\tau_T$ for the repeater and the coordinates $(x_R, y_R, z_R)$ of the position of the repeater are derived by solving for four equations that may be represented as:

$$m_i = \tau_T + \frac{1}{c}\sqrt{(x_i - x_R)^2 + (y_i - y_R)^2 + (z_i - z_R)^2}, \ 1 \leq i \leq 4$$

where c is the speed of light; and
   deriving one of more calibration parameters for the repeater from (a) the time measurements, and (b) the positions of the measurement locations, wherein the one or more calibration parameters comprise a time correction for the repeater, and the position of the repeater.

2. A computer-readable medium including instructions stored thereon, comprising:
   a set of instructions for determining a time correction $\sigma_T$ for an entity, and
   a set of instructions for determining a set of coordinates $(x_R, y_R, z_R)$ of the entity from (1) time measurements obtained at four different measurement locations that are referred to as $m_i$, $1 \leq i \leq 4$, and (2) a set of coordinates $(x_i, y_i, z_i)$, $1 \leq i \leq 4$, of the measurement locations, by solving for four equations that may be represented as:

$$m_i = \tau_T + \frac{1}{c}\sqrt{(x_i - x_R)^2 + (y_i - y_R)^2 + (z_i - z_R)^2}, \ 1 \leq i \leq 4$$

where c is the speed of light.

* * * * *